Jan. 20, 1959 W. B. DREVITSON 2,869,658

TRACTOR FOR CONTROLLING MOVEMENT OF THE HUMAN HAND

Filed March 15, 1955

INVENTOR
WESLEY B. DREVITSON

BY George Sipkin
B. L. Zangerle
ATTORNEYS 2,869,658

Patented Jan. 20, 1959

2,869,658

TRACTOR FOR CONTROLLING MOVEMENT OF THE HUMAN HAND

Wesley B. Drevitson, Alexandria, Va.

Application March 15, 1955, Serial No. 494,589

3 Claims. (Cl. 180—1)

(Granted under Title 35, U. S. Code (1952), sec. 266)

The invention described herein may be manufactured and used by or for the Government of the United States of America for governmental purposes without the payment of any royalties thereon or therefor.

This invention relates to a hand tractor and more particularly to a hand tractor for guiding a work operation at a predetermined constant speed.

Heretofore there have been numerous devices for controlling the speed of a machine or tool and all have been bulky and unsuitable for hand use or for use in other than linear operations. Present devices for controlling the speed of a tool or machine are integral with the controlled device and are generally too large for hand use; further they usually require outside power to drive them and tracks or other devices to guide them. These characteristics limit the application of the device to a particular function.

This invention is a self-contained tractor, small enough to be grasped in one hand, which will impart to the hand holding it and a tool a constant or variable motion of travel over any surface. The tractor comprises a self-propelled driving mechanism for driving a friction wheel and a governor; the governor being adapted to variably control the speed of the driving mechanism. The tractor driving mechanism does not require any outside source of power or separate means to guide it. Further, it is adapted to control the rate of movement over surfaces of varying contours, and its use therefor is not limited to any particular function.

An object of the present invention is the provision of a self-contained, self-propelled hand tractor adapted to navigate surfaces of various contours.

Another object is to provide a tractor small enough to be carried in one hand whereby a work operation may be directed.

A further object is the provision of a hand tractor adapted to guide any of a plurality of work operations at a controlled variable rate.

Still another object is to provide a hand tractor having a controlled rate of speed.

A still further object is the provision of a hand tractor which is simple, reliable and inexpensive to construct.

Other objects and many of the attendant advantages of this invention will be readily appreciated as the same becomes better understood by reference to the following detailed description when considered in connection with the accompanying drawings wherein.

Figure 2:
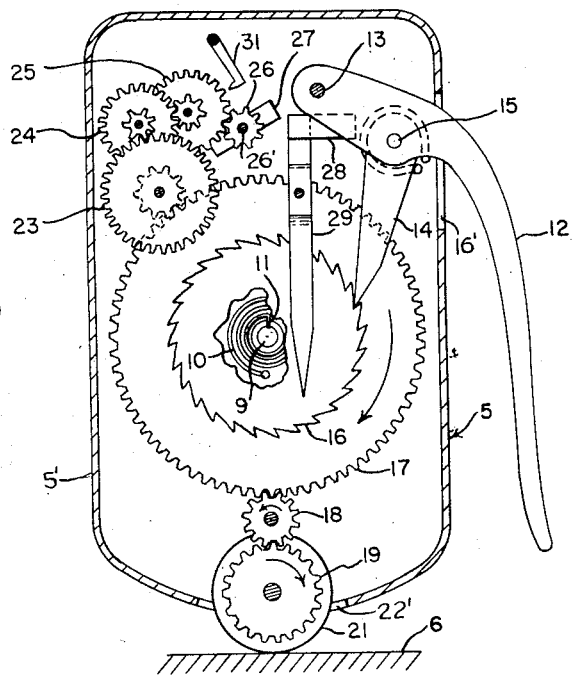
Fig. 2 is a front elevation with the outer casing cut away.
Figure 4:
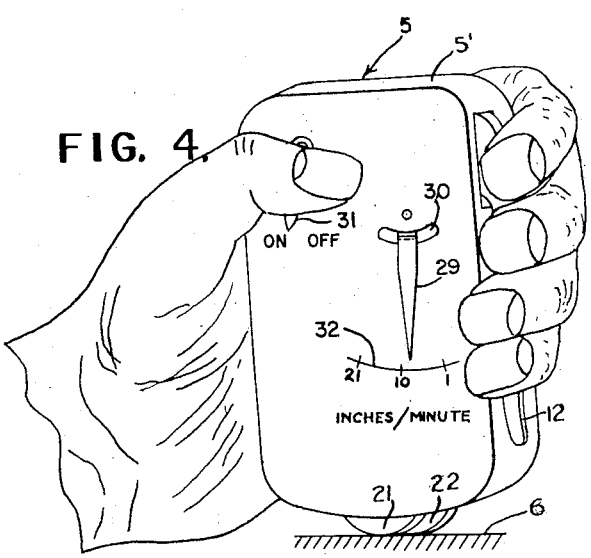
Fig. 4 shows a perspective view of the hand tractor.

Referring now to the drawings, wherein like reference characters designate like or corresponding parts throughout the several views there is shown a hand tractor 5 adapted to navigate a surface 6. The tractor 5 comprises an outer casing 5', the casing being small and somewhat rectangular in horizontal cross section. The tractor is of small size so that it can be held, as shown in Fig. 4, in the hand or fist of an operator, just as a pack of cigarettes or the handle of a small hand tool is; so that size-wise, the term "small" is intended to be so limited. The casing 5' has several slots or openings, subsequently identified, through which parts of the mechanism inside the tractor 5 extend. The hand tractor derives motive power from a spring motor 7 comprising a housing 8 mounted for rotation relative to a shaft 9. A flat spring 10 in the housing 8 has one of its ends secured thereto (not shown) and the other end secured to the shaft 9 through a slot 11 therein. A lever 12 having an inner end pivoted inside housing 8 as at 13 is provided to wind the spring 10, and cooperates with a spring biased pawl 14 pivoted on the lever 12 about an axis 15 and a ratchet wheel 16 secured to shaft 9. The lever 12 extends through a vertical slot 16' in the casing 5', the shape of the lever being such that it is spaced from a vertical edge of the casing 5' when the pawl 14 is in the wind-up position, as shown in Fig. 2. A main gear 17 is secured to the housing 8 of the spring motor and is driven as the spring unwinds. The spring 10 is preferably one capable of storing and releasing sufficient power to drive the tractor for a required distance.

Figure 1:
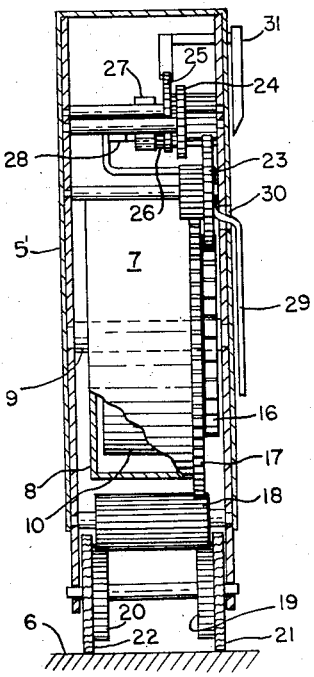
Fig. 1 is a side elevation of the tractor with the outer casing and a portion of the spring motor cover cut away.

A gear 18 driven by gear 17 drives gears 19 and 20. Friction wheels 21 and 22 mounted on the shaft of gears 19 and 20 are adapted to propel the device. The friction wheels 21 and 22 are located at the bottom of the tractor, the tractor being provided with a bottom opening 22', through which the lower parts of the wheels 21 and 22 extend, as shown in Figs. 1 and 2. The wheels 21 and 22 may be interchangeable with wheels of different materials or various types of edges depending on the type of surface upon which the device is used. Multiple wheels, leading or parallel are used for influencing the direction of the device in motion. Of course the gear train driving the friction wheels may consist of any number of gears depending on the speed desired in the friction wheel and also if desired the device might incorporate a reversing gear set (not shown) which could be controlled by a lever (not shown).

Also driven by main gear 17 is a gear train comprising gears 23, 24, 25 and 26. Gear 26 carries on its shaft 26' a metal bar 27 adapted to rotate across and be influenced by the flux set up by the N-S poles of a U-shaped permanent magnet 28 made from a material having a high residual magnetism. Controlling the position of magnet 28 is a lever 29 welded or otherwise attached thereto extending through a slot 30 in the casing of the tractor 5. By controlling the position of magnet 28 through the lever 29, the effect of the lines of force on bar 27 is either to increase or decrease the speed of the rotating bar when the magnet is moved closer to or away from the bar. Hence by controlling the position of magnet 28 the movement of bar 27 may be retarded by a controlled amount of the magnetic forces exerted on the bar and gears 23, 24, and 25 in turn will also be slowed down due to the cooperation of these elements with bar 27. Hence magnet 28 and bar 27 constitute a governor.

Figure 3:
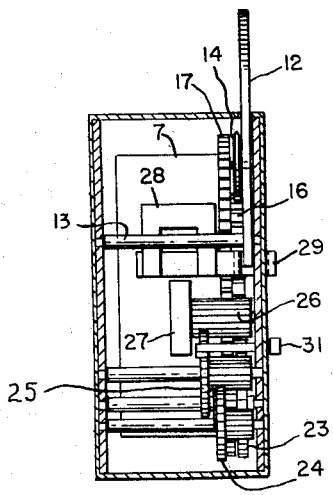
Fig. 3 is a plan view with the outer casing cut away.

Fig. 3 shows the cooperation of bar 27 and magnet 28 and also an illustration of an on-off switch 31 adapted to engage the teeth of any one of the gears in the governor gear train to prevent movement thereof and stop the unwinding of the spring motor.

Fig. 4 shows the device as it would be used. A scale 32 is calibrated so that the position of lever 29 corresponds to any desired speed. If the motor runs down while in operation a withdrawal and subsequent squeeze on lever 12 will reenergize the motor without affecting the operation in a manner corresponding to that of a spring-driven clock, the lever 12 operating through pawl 14 to turn ratchet wheel 16 to wind the spring 10. The uses to which the device may be put are legion e. g. all types of welding, painting, as a means for moving a paper at a controlled rate of speed, etc.

Obviously many modifications and variations of the present invention are possible in the light of the above teachings. It is therefore to be understood that within the scope of the appended claims the invention may be practiced otherwise than as specifically described.

What is claimed is:

1. A manual, self-contained, self-propelled hand tractor for controlling hand movement along a surface, said tractor being of small size, whereby it may be gripped in the fist of an operator, said tractor comprising an outer casing, said casing having a bottom, said tractor comprising traction wheel means extending below said bottom whereby said wheel means can rest on said surface with said casing extending upwardly therefrom, a spring motor, means supporting said motor inside said casing, gearing mounted inside said casing connecting said motor and wheel means, whereby said motor can drive said wheel means, speed control means inside said casing for controlling the speed at which said motor drives said wheel means, said motor comprising a ratchet, a pawl operable for moving said ratchet to wind said motor, and a manually operable member connected to said pawl and capable of movement to operate said pawl, said member having a portion extending outwardly of an edge of said casing and adapted for said movement by said fist.

2. A hand tractor as defined in claim 1 but further characterized by said speed control means comprising a manually operable speed-adjusting member extending outside said casing in an upper position thereon whereby it is adapted to be operated by the thumb of said fist.

3. A hand tractor as defined in claim 1 wherein the first said manually operable member comprises a lever pivoted inside said casing but having said portion extending out of the casing, said pawl being pivoted on said lever inside said casing.

References Cited in the file of this patent

UNITED STATES PATENTS

| | | |
|---|---|---|
| 1,159,437 | Wachtelhausen | Nov. 9, 1914 |
| 1,440,126 | Aust | Dec. 26, 1922 |
| 1,699,207 | Reed | Jan. 15, 1929 |
| 2,233,075 | Dailey et al. | Feb. 25, 1941 |
| 2,416,772 | Reece | Mar. 4, 1947 |
| 2,442,505 | Millett | June 1, 1948 |
| 2,490,309 | Lehman | Dec. 6, 1949 |
| 2,497,428 | Arguelles | Feb. 14, 1950 |
| 2,586,907 | Bernard | Feb. 26, 1952 |
| 2,724,065 | Saxl | Nov. 15, 1955 |

FOREIGN PATENTS

| | | |
|---|---|---|
| 801,802 | Germany | Jan. 25, 1951 |